(12) United States Patent
Jose

(10) Patent No.: US 11,386,083 B1
(45) Date of Patent: Jul. 12, 2022

(54) METHOD FOR PERFORMING A BATCH PROCESS ON STRUCTURED DATA

(71) Applicant: KeyGen Data LLC, Columbia, MD (US)

(72) Inventor: Joseph Jose, Chantilly, VA (US)

(73) Assignee: KEYGEN DATA LLC, Columbia, MD (US)

(*) Notice: Subject to any disclaimer, the term of this patent is extended or adjusted under 35 U.S.C. 154(b) by 203 days.

(21) Appl. No.: 16/909,052

(22) Filed: Jun. 23, 2020

Related U.S. Application Data

(60) Provisional application No. 62/887,577, filed on Aug. 15, 2019.

(51) Int. Cl.
*G06F 16/23* (2019.01)
*G06F 16/22* (2019.01)
*G06Q 10/06* (2012.01)

(52) U.S. Cl.
CPC ...... *G06F 16/2379* (2019.01); *G06F 16/2282* (2019.01); *G06Q 10/067* (2013.01)

(58) Field of Classification Search
CPC ............ G06F 16/2379; G06F 16/2282; G06Q 10/067
See application file for complete search history.

(56) References Cited

U.S. PATENT DOCUMENTS

| 7,206,793 | B2 | 4/2007 | Majumder | |
|---|---|---|---|---|
| 2008/0201290 | A1* | 8/2008 | Ponmudi | G06F 16/217 |

OTHER PUBLICATIONS

Customer Database, Cursor Processing using a COBOL with Embedded SQL Statements. Downloaded from web page: <http://www.simotime.com/cuqcp101.htm>, download date: Jun. 11, 2020, original posting date: unknown, Copyright© 1987-2019, SimoTime Technologies and Services, 15 pages.

* cited by examiner

*Primary Examiner* — Robert W Beausoliel, Jr.
*Assistant Examiner* — Mohammad Solaiman Bhuyan
(74) *Attorney, Agent, or Firm* — Panitch Schwarze belisario & Nadel LLP

(57) ABSTRACT

A batch process operates on structured data in multiple tables, including a first and a second source table, and a first and a second processing table. An additional key is added within each natural key to at least the second source and processing table for identifying a sequence of rows for updating.

20 Claims, 31 Drawing Sheets

MT

| DB AMT | TRAN # | TRAN DATE | ACCOUNT # |
|---|---|---|---|
| 200 | 81 | 5/11/2010 | 0001257 |
| 150 | 92 | 7/11/2010 | 0001257 |
| 100 | 30 | 11/22/2019 | 0085578 |
| 500 | 121 | 8/10/2018 | 0001435 |
| 300 | 12 | 5/10/2018 | 0045383 |
| 800 | 15 | 6/11/2018 | 0045383 |
| 1000 | 17 | 7/12/2018 | 0045383 |
| 150 | 52 | 4/4/2019 | 0053535 |
| 200 | 60 | 5/4/2019 | 0053535 |
| 120 | 67 | 6/4/2019 | 0053535 |
| 800 | 8 | 7/10/2019 | 0063736 |
| 600 | 10 | 8/10/2019 | 0063736 |

TT

| ACCOUNT # | TRAN DATE | TRAN # | CR AMT |
|---|---|---|---|
| 0001257 | 10/11/2020 | 85 | -350 |
| 0085578 | 12/22/2019 | 37 | -100 |
| 0001435 | 8/21/2018 | 131 | -200 |
| 0001435 | 9/21/2018 | 142 | -150 |
| 0001435 | 10/21/2018 | 148 | -100 |
| 0045383 | 10/12/2018 | 25 | -2100 |
| 0053535 | 7/12/2019 | 68 | -100 |
| 0053535 | 8/12/2019 | 71 | -300 |

Initial Tables

| DB AMT | TRAN # | TRAN DATE | ACCOUNT # | SEQ # |
|---|---|---|---|---|
| 200 | 81 | 5/11/2010 | 0001257 | 1 |
| 150 | 92 | 7/11/2010 | 0001257 | 2 |
| 100 | 30 | 11/22/2019 | 0085578 | 1 |
| 500 | 121 | 8/10/2018 | 0001435 | 1 |
| 300 | 12 | 5/10/2018 | 0045383 | 1 |
| 800 | 15 | 6/11/2018 | 0045383 | 2 |
| 1000 | 17 | 7/12/2018 | 0045383 | 3 |
| 150 | 52 | 4/4/2019 | 0053535 | 1 |
| 200 | 60 | 5/4/2019 | 0053535 | 2 |
| 120 | 67 | 6/4/2019 | 0053535 | 3 |
| 800 | 8 | 7/10/2019 | 0063736 | 1 |
| 600 | 10 | 8/10/2019 | 0063736 | 2 |

TT

| SEQ # | ACCOUNT # | TRAN DATE | TRAN # | CR AMT |
|---|---|---|---|---|
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 2 | 0001435 | 9/21/2018 | 142 | -150 |
| 3 | 0001435 | 10/21/2018 | 148 | -100 |
| 1 | 0045383 | 10/12/2018 | 25 | -2100 |
| 1 | 0053535 | 7/12/2019 | 68 | -100 |
| 2 | 0053535 | 8/12/2019 | 71 | -300 |

Loop 1; Steps I and II

| DB AMT | TRAN # | TRAN DATE | ACCOUNT # | SEQ # |
|---|---|---|---|---|
| 200 | 81 | 5/11/2010 | 0001257 | 1 |
| 150 | 92 | 7/11/2010 | 0001257 | 2 |
| 100 | 30 | 11/22/2019 | 0085578 | 1 |
| 500 | 121 | 8/10/2018 | 0001435 | 1 |
| 300 | 12 | 5/10/2018 | 0045383 | 1 |
| 800 | 15 | 6/11/2018 | 0045383 | 2 |
| 1000 | 17 | 7/12/2018 | 0045383 | 3 |
| 150 | 52 | 4/4/2019 | 0053535 | 1 |
| 200 | 60 | 5/4/2019 | 0053535 | 2 |
| 120 | 67 | 6/4/2019 | 0053535 | 3 |
| <u>800</u> | <u>8</u> | <u>7/10/2019</u> | <u>0063736</u> | <u>1</u> |
| <u>600</u> | <u>10</u> | <u>8/10/2019</u> | <u>0063736</u> | <u>2</u> |

TT

| SEQ # | ACCOUNT # | TRAN DATE | TRAN # | CR AMT |
|---|---|---|---|---|
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 2 | 0001435 | 9/21/2018 | 142 | -150 |
| 3 | 0001435 | 10/21/2018 | 148 | -100 |
| 1 | 0045383 | 10/12/2018 | 25 | -2100 |
| 1 | 0053535 | 7/12/2019 | 68 | -100 |
| 2 | 0053535 | 8/12/2019 | 71 | -300 |

Loop 1; Step III

Figure 4C

| | MT | | | |
|---|---|---|---|---|
| DB AMT | TRAN # | TRAN DATE | ACCOUNT # | SEQ # |
| 200 | 81 | 5/11/2010 | 0001257 | 1 |
| 100 | 30 | 11/22/2019 | 0085578 | 1 |
| 500 | 121 | 8/10/2018 | 0001435 | 1 |
| 300 | 12 | 5/10/2018 | 0045383 | 1 |
| 150 | 52 | 4/4/2019 | 0053535 | 1 |

| | TT | | | |
|---|---|---|---|---|
| SEQ # | ACCOUNT # | TRAN DATE | TRAN # | CR AMT |
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 1 | 0045383 | 10/12/2018 | 25 | -2100 |
| 1 | 0053535 | 7/12/2019 | 68 | -100 |

Loop 1; Step IV

Figure 4D

| MT | | | |
|---|---|---|---|
| DB AMT | TRAN # | TRAN DATE | ACCOUNT # | SEQ # |
| ~~200~~ 0 | 81 | 5/11/2010 | 0001257 | 1 |
| ~~100~~ 0 | 30 | 11/22/2019 | 0085578 | 1 |
| ~~500~~ 300 | 121 | 8/10/2018 | 0001435 | 1 |
| ~~300~~ 0 | 12 | 5/10/2018 | 0045383 | 1 |
| ~~150~~ 50 | 52 | 4/4/2019 | 0053535 | 1 |

| TT | | | |
|---|---|---|---|
| SEQ # | ACCOUNT # | TRAN DATE | TRAN # | CR AMT |
| 1 | 0001257 | 10/11/2020 | 85 | ~~350~~ -150 |
| 1 | 0085578 | 12/22/2019 | 37 | ~~100~~ 0 |
| 1 | 0001435 | 8/21/2018 | 131 | ~~200~~ 0 |
| 1 | 0045383 | 10/12/2018 | 25 | ~~2100~~ -1800 |
| 1 | 0053535 | 7/12/2019 | 68 | ~~100~~ 0 |

Loop 1; Step V

Figure 4E

| TT | | | |
|---|---|---|---|
| ACCOUNT # | TRAN DATE | TRAN # | CR AMT |
| 0001257 | 10/11/2020 | 85 | ~~350~~ -150 |
| 0085578 | 12/22/2019 | 37 | ~~100~~ 0 |
| 0001435 | 8/21/2018 | 131 | ~~200~~ 0 |
| 0001435 | 9/21/2018 | 142 | -150 |
| 0001435 | 10/21/2018 | 148 | -100 |
| 0045383 | 10/12/2018 | 25 | ~~2100~~ -1800 |
| 0053535 | 7/12/2019 | 68 | ~~100~~ 0 |
| 0053535 | 8/12/2019 | 71 | -300 |

| MT | | | |
|---|---|---|---|
| DB AMT | TRAN # | TRAN DATE | ACCOUNT # |
| ~~200~~ 0 | 81 | 5/11/2010 | 0001257 |
| 150 | 92 | 7/11/2010 | 0001257 |
| ~~100~~ 0 | 30 | 11/22/2019 | 0085578 |
| ~~500~~ 300 | 121 | 8/10/2018 | 0001435 |
| ~~300~~ 0 | 12 | 5/10/2018 | 0045383 |
| 800 | 15 | 6/11/2018 | 0045383 |
| 1000 | 17 | 7/12/2018 | 0045383 |
| ~~150~~ 50 | 52 | 4/4/2019 | 0053535 |
| 200 | 60 | 5/4/2019 | 0053535 |
| 120 | 67 | 6/4/2019 | 0053535 |
| 800 | 8 | 7/10/2019 | 0063736 |
| 600 | 10 | 8/10/2019 | 0063736 |

Loop 1; Step VI

Figure 4F

| MT | | | |
|---|---|---|---|
| DB AMT | TRAN # | TRAN DATE | ACCOUNT # | SEQ # |
| 200 | 81 | 5/11/2010 | 0001257 | 1 |
| 150 | 92 | 7/11/2010 | 0001257 | 2 |
| 100 | 30 | 11/22/2019 | 0085578 | 1 |
| 500 | 121 | 8/10/2018 | 0001435 | 1 |
| 300 | 12 | 5/10/2018 | 0045383 | 1 |
| 800 | 15 | 6/11/2018 | 0045383 | 2 |
| 1000 | 17 | 7/12/2018 | 0045383 | 3 |
| 150 | 52 | 4/4/2019 | 0053535 | 1 |
| 200 | 60 | 5/4/2019 | 0053535 | 2 |
| 120 | 67 | 6/4/2019 | 0053535 | 3 |
| 800 | 8 | 7/10/2019 | 0063736 | 1 |
| 600 | 10 | 8/10/2019 | 0063736 | 2 |

| TT | | | |
|---|---|---|---|
| SEQ # | ACCOUNT # | TRAN DATE | TRAN # | CR AMT |
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 2 | 0001435 | 9/21/2018 | 142 | -150 |
| 3 | 0001435 | 10/21/2018 | 148 | -100 |
| 1 | 0045383 | 10/12/2018 | 25 | -2100 |
| 1 | 0053535 | 7/12/2019 | 68 | -100 |
| 2 | 0053535 | 8/12/2019 | 71 | -300 |

Loop 2; Step I and II

Figure 4G

| MT | | |
|---|---|---|
| ACCOUNT BALANCE | ACCOUNT # | SEQ # |
| 350 | 0001257 | 1 |
| 100 | 0085578 | 1 |
| 500 | 0001435 | 1 |
| 2100 | 0045383 | 1 |
| 470 | 0053535 | 1 |

| TT | | | | |
|---|---|---|---|---|
| SEQ # | ACCOUNT # | TRAN DATE | TRAN # | CR AMT |
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 2 | 0001435 | 9/21/2018 | 142 | -150 |
| 3 | 0001435 | 10/21/2018 | 148 | -100 |
| 1 | 0045383 | 10/12/2018 | 25 | -2100 |
| 1 | 0053535 | 7/12/2019 | 68 | -100 |
| 2 | 0053535 | 8/12/2019 | 71 | -300 |

Loop 1; Steps II and III

Figure 5A

| MT | | |
|---|---|---|
| ACCOUNT BALANCE | ACCOUNT # | SEQ # |
| 350 | 0001257 | 1 |
| 100 | 0085578 | 1 |
| 500 | 0001435 | 1 |
| 2100 | 0045383 | 1 |
| 470 | 0053535 | 1 |

| TT | | | | |
|---|---|---|---|---|
| SEQ # | ACCOUNT # | TRAN DATE | TRAN # | CR AMT |
| 1 | 0001257 | 10/11/2020 | 85 | -350 |
| 1 | 0085578 | 12/22/2019 | 37 | -100 |
| 1 | 0001435 | 8/21/2018 | 131 | -200 |
| 1 | 0045383 | 10/12/2018 | 25 | -2100 |
| 1 | 0053535 | 7/12/2019 | 68 | -100 |

Loop 1: Step IV

Figure 5B

| MT | | |
|---|---|---|
| ACCOUNT BALANCE | ACCOUNT # | SEQ # |
| 0 ~~350~~ | 0001257 | 1 |
| 0 ~~100~~ | 0085578 | 1 |
| 300 ~~500~~ | 0001435 | 1 |
| 0 ~~2100~~ | 0045383 | 1 |
| 370 ~~470~~ | 0053535 | 1 |

| TT | | | | |
|---|---|---|---|---|
| SEQ # | ACCOUNT # | TRAN DATE | TRAN # | CR AMT |
| 1 | 0001257 | 10/11/2020 | 85 | 0 ~~350~~ |
| 1 | 0085578 | 12/22/2019 | 37 | 0 ~~100~~ |
| 1 | 0001435 | 8/21/2018 | 131 | 0 ~~200~~ |
| 1 | 0045383 | 10/12/2018 | 25 | 0 ~~2100~~ |
| 1 | 0053535 | 7/12/2019 | 68 | 0 ~~100~~ |

Loop 1; Step V

Figure 5C

| MT | |
|---|---|
| ACCOUNT BALANCE | ACCOUNT # |
| 0 ~~350~~ | 0001257 |
| 0 ~~100~~ | 0085578 |
| 300 500 | 0001435 |
| 0 ~~2100~~ | 0045383 |
| 370 470 | 0053535 |

| TT | | | |
|---|---|---|---|
| ACCOUNT # | TRAN DATE | TRAN # | CR AMT |
| 0001257 | 10/11/2020 | 85 | 0 ~~-350~~ |
| 0085578 | 12/22/2019 | 37 | 0 ~~-100~~ |
| 0001435 | 8/21/2018 | 131 | 0 ~~-200~~ |
| 0045383 | 10/12/2018 | 25 | 0 ~~-2100~~ |
| 0001435 | 9/21/2018 | 142 | -150 |
| 0001435 | 10/21/2018 | 148 | -100 |
| 0053535 | 7/12/2019 | 68 | 0 ~~-100~~ |
| 0053535 | 8/12/2019 | 71 | -300 |

Loop 1; Step VI

Figure 5D

| | TT | | | |
|---|---|---|---|---|
| SEQ # | ACCOUNT # | TRAN DATE | TRAN # | CR AMT |
| 1 | 0001435 | 9/21/2018 | 142 | -150 |
| 2 | 0001435 | 10/21/2018 | 148 | -100 |
| 1 | 0053535 | 8/12/2019 | 71 | -300 |

| | MT | |
|---|---|---|
| ACCOUNT BALANCE | ACCOUNT # | SEQ # |
| 300 | 0001435 | 1 |
| 370 | 0053535 | 1 |

Loop 2; Steps II and III

Figure 5E

| | TT | | | |
|---|---|---|---|---|
| SEQ # | ACCOUNT # | TRAN DATE | TRAN # | CR AMT |
| 1 | 0001435 | 9/21/2018 | 142 | -150 |
| 1 | 0053535 | 8/12/2019 | 71 | -300 |

| MT | | |
|---|---|---|
| ACCOUNT BALANCE | ACCOUNT # | SEQ # |
| 300 | 0001435 | 1 |
| 370 | 0053535 | 1 |

Loop 2; Step IV

Figure 5F

| | TT | | | |
|---|---|---|---|---|
| SEQ # | ACCOUNT # | TRAN DATE | TRAN # | CR AMT |
| 1 | 0001435 | 9/21/2018 | 142 | 0 ~~150~~ |
| 1 | 0053535 | 8/12/2019 | 71 | 0 ~~300~~ |

| MT | | |
|---|---|---|
| ACCOUNT BALANCE | ACCOUNT # | SEQ # |
| 150 ~~300~~ | 0001435 | 1 |
| 70 ~~370~~ | 0053535 | 1 |

Loop 2; Step V

Figure 5G

| TT | | | |
|---|---|---|---|
| ACCOUNT # | TRAN DATE | TRAN # | CR AMT |
| 0001435 | 9/21/2018 | 142 | 0 ~~150~~ |
| 0001435 | 10/21/2018 | 148 | -100 |
| 0053535 | 8/12/2019 | 71 | 0 ~~300~~ |

| MT | |
|---|---|
| ACCOUNT BALANCE | ACCOUNT # |
| 150 ~~300~~ | 0001435 |
| 70 ~~370~~ | 0053535 |

Loop 2; Step VI

Figure 5H

| TT | | | | |
|---|---|---|---|---|
| SEQ # | ACCOUNT # | TRAN DATE | TRAN # | CR AMT |
| 1 | 0001435 | 10/21/2018 | 148 | -100 |

| MT | | |
|---|---|---|
| ACCOUNT BALANCE | ACCOUNT # | SEQ # |
| 150 | 0001435 | 1 |
| 70 | 0053535 | 1 |

Loop 3; Steps II and III

Figure 5I

| TT | | | | |
|---|---|---|---|---|
| SEQ # | ACCOUNT # | TRAN DATE | TRAN # | CR AMT |
| 1 | 0001435 | 10/21/2018 | 148 | 100 |

| MT | | |
|---|---|---|
| ACCOUNT BALANCE | ACCOUNT # | SEQ # |
| 150 | 0001435 | 1 |

Loop 3; Step IV

Figure 5J

| TT | | | |
|---|---|---|---|
| SEQ # | ACCOUNT # | TRAN DATE | TRAN # | CR AMT |
| 1 | 0001435 | 10/21/2018 | 148 | 0 ~~100~~ |

| MT | | |
|---|---|---|
| ACCOUNT BALANCE | ACCOUNT # | SEQ # |
| 50 ~~150~~ | 0001435 | 1 |

Loop 3; Step V

Figure 5K

| MT | |
|---|---|
| ACCOUNT BALANCE | ACCOUNT # |
| 50 | 0001435 |

| TT | | | |
|---|---|---|---|
| ACCOUNT # | TRAN DATE | TRAN # | CR AMT |
| 0001435 | 10/21/2018 | 148 | 0 ~~100~~ |

Loop 3; Step VI

| DATE LAST CHANGED | ADDRESS | NAME | SSN | SEQ # |
|---|---|---|---|---|
| 1/1/2018 | 101 Broad Street, NY | Pete | 750821111 | 1 |
| 2/20/2019 | 65 Camden Rd, FL | Joe | 830381542 | 1 |

TT

| Processed Indicator | SEQ # | SSN | NAME | ADDRESS | DATE MOVED |
|---|---|---|---|---|---|
| N | 1 | 750821111 | Pete | 722 New Street, NJ | 5/1/2018 |
| N | 2 | 750821111 | Pete | 125 River Rd, PA | 10/11/2018 |
| N | 3 | 750821111 | Pete | 1528 Elden Rd, VA | 12/15/2018 |
| N | 1 | 830381542 | Joe | 41 Park Street, GA | 5/20/2019 |
| N | 2 | 830381542 | Joe | 30 Forest Rd, CA | 8/21/2019 |

Loop 1; Steps II and III

Figure 6A

| MT | | | | |
|---|---|---|---|---|
| DATE LAST CHANGED | ADDRESS | NAME | SSN | SEQ # |
| 1/1/2018 | 101 Broad Street, NY | Pete | 750821111 | 1 |
| 2/20/2019 | 65 Camden Rd, FL | Joe | 830381542 | 1 |

| TT | | | | |
|---|---|---|---|---|
| SEQ # | SSN | NAME | ADDRESS | DATE MOVED |
| 1 | 750821111 | Pete | 722 New Street, NJ | 5/1/2018 |
| 1 | 830381542 | Joe | 41 Park Street, GA | 5/20/2019 |

Loop 1; Step IV

Figure 6B

| MT | | | |
|---|---|---|---|
| DATE LAST CHANGED | ADDRESS | NAME | SSN | SEQ # |
| 5/1/2018 | 722 New Street, NJ | Pete | 750821111 | 1 |
| 5/20/2019 | 41 Park Street, GA | Joe | 830381542 | 1 |

| TT | | | | | |
|---|---|---|---|---|---|
| Processed Indicator | SEQ # | SSN | NAME | ADDRESS | DATE MOVED |
| Y | 1 | 750821111 | Pete | 722 New Street, NJ | 5/1/2018 |
| Y | 1 | 830381542 | Joe | 41 Park Street, GA | 5/20/2019 |

Loop 1; Step V

Figure 6C

| MT | | |
|---|---|---|
| DATE LAST CHANGED | ADDRESS | NAME | SSN |
| ~~1/1/2018~~ 5/1/2018 | ~~101 Broad Street, NY~~ 722 New St, NJ | Pete | 750821111 |
| ~~2/20/2019~~ 5/20/2019 | ~~65 Camden Rd, FL~~ 41 Park St, GA | Joe | 830381542 |

| TT | | | | |
|---|---|---|---|---|
| Processed Indicator | SSN | NAME | ADDRESS | DATE MOVED |
| ~~Y~~ N | 750821111 | Pete | 722 New Street, NJ | 5/1/2018 |
| N | 750821111 | Pete | 125 River Rd, PA | 10/11/2018 |
| N | 750821111 | Pete | 1528 Elden Rd, VA | 12/15/2018 |
| ~~Y~~ N | 830381542 | Joe | 41 Park Street, GA | 5/20/2019 |
| N | 830381542 | Joe | 30 Forest Rd, CA | 8/21/2019 |

Loop 1; Step VI

| Processed Indicator | SEQ # | SSN | NAME | ADDRESS | DATE MOVED |
|---|---|---|---|---|---|
| N | 1 | 750821111 | Pete | 125 River Rd, PA | 10/11/2018 |
| N | 2 | 750821111 | Pete | 1528 Elden Rd, VA | 12/15/2018 |
| N | 1 | 830381542 | Joe | 30 Forest Rd, CA | 8/21/2019 |

MT

| DATE LAST CHANGED | ADDRESS | NAME | SSN | SEQ # |
|---|---|---|---|---|
| 5/1/2018 | 722 New Street, NJ | Pete | 750821111 | 1 |
| 5/20/2019 | 41 Park Street, GA | Joe | 830381542 | 1 |

Loop 2; Step II and III

Figure 6E

| MT | | | | |
|---|---|---|---|---|
| DATE LAST CHANGED | ADDRESS | NAME | SSN | SEQ # |
| 5/1/2018 | 722 New Street, NJ | Pete | 750821111 | 1 |
| 5/20/2019 | 41 Park Street, GA | Joe | 830381542 | 1 |

| TT | | | | |
|---|---|---|---|---|
| Processed Indicator | SEQ # | SSN | NAME | ADDRESS | DATE MOVED |
| N | 1 | 750821111 | Pete | 125 River Rd, PA | 10/11/2018 |
| N | 1 | 830381542 | Joe | 30 Forest Rd, CA | 8/21/2019 |

Loop 2; Step IV

Figure 6F

| MT | | | | |
|---|---|---|---|---|
| DATE LAST CHANGED | ADDRESS | NAME | SSN | SEQ # |
| ~~5/1/2018~~ 10/11/2018 | ~~722 New Street, NJ~~ 125 River Rd, PA | Pete | 750821111 | 1 |
| ~~5/20/2019~~ 8/21/2019 | ~~41 Park St, GA~~ 30 Forest Rd, CA | Joe | 830381542 | 1 |

| TT | | | | | |
|---|---|---|---|---|---|
| Processed Indicator | SEQ # | SSN | NAME | ADDRESS | DATE MOVED |
| Y ~~N~~ | 1 | 750821111 | Pete | 125 River Rd, PA | 10/11/2018 |
| Y ~~N~~ | 1 | 830381542 | Joe | 30 Forest Rd, CA | 8/21/2019 |

Loop 2; Step V

| SSN | NAME | ADDRESS | DATE MOVED |
|---|---|---|---|
| ~~750821111~~ | ~~Pete~~ | ~~722 New Street, NJ~~ | ~~5/1/2018~~ |
| ~~750821111~~ | ~~Pete~~ | ~~125 River Rd, PA~~ | ~~10/11/2018~~ |
| 750821111 | Pete | 1528 Elden Rd, VA | 12/15/2018 |
| ~~830381542~~ | ~~Joe~~ | ~~41 Park Street, GA~~ | ~~5/20/2019~~ |
| ~~830381542~~ | ~~Joe~~ | ~~30 Forest Rd, CA~~ | ~~8/21/2019~~ |

MT

| DATE LAST CHANGED | ADDRESS | NAME | SSN |
|---|---|---|---|
| ~~5/1/2018~~ 10/11/2018 | ~~101 Broad St, NY~~ 125 River Rd, PA | Pete | 750821111 |
| ~~5/20/2019~~ 8/21/2019 | ~~65 Camden Rd, FL~~ 30 Forest Rd, CA | Joe | 830381542 |

Loop 2; Step VI

Figure 6H

| MT | | | |
|---|---|---|---|
| DATE LAST CHANGED | ADDRESS | NAME | SSN | SEQ # |
| 10/11/2018 | 125 River Rd, PA | Pete | 750821111 | 1 |

| TT | | | |
|---|---|---|---|
| SEQ # | SSN | NAME | ADDRESS | DATE MOVED |
| 1 | 750821111 | Pete | 1528 Elden Rd, VA | 12/15/2018 |

Loop 3; Step II and III

Figure 6I

METHOD FOR PERFORMING A BATCH PROCESS ON STRUCTURED DATA

CROSS-REFERENCE TO RELATED APPLICATIONS

This application claims the benefit of U.S. Provisional Patent Application No. 62/887,577 filed Aug. 15, 2019, the entire disclosure of which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

A new batch processing method is disclosed using relational database tables without the sequential reading of data. Preferred embodiments of the present invention make processing large datasets in a batch process using tables possible and it also eliminates the need for using a cursor processing method available in Relational Database Management System (RDBMS). The new method described herein is 100 to 300 times faster than the currently available processing method when used in column store databases. In fact, random batch processing is the only viable option when processing large datasets with billions of rows in tables when an SQL process is required to mimic a batch process written in COBOL or any other programming language.

Currently there is only one method available to process data in tables in batch/sequential mode. The cursor processing method fetches data row by row, sorted by key, from one or multiple tables, applies the business rules, updates the current row, and then fetches the next row in the sequence. The cursor processing method is an extremely slow process. Tests with the cursor method indicate that the processing rate is only 10,000 to 20,000 rows per minute. At this rate, processing tens of billions of rows would be impossible within a reasonable timeframe. Accordingly, there is a need in the art for other options to process large datasets in tables. The present invention fulfills this need.

BRIEF SUMMARY OF THE INVENTION

The batch processing method described herein is easy to develop with simple SQL skills. The method can be up to 300 times faster than the currently available processing method when used in column store databases, depending on the total number of accounts/keys to process and the number of transactions per account or key.

Random batch processing enables organizations to migrate all of their batch processes to a database centric process with greater performance than legacy systems. Legacy systems are expensive to maintain and human resources available to maintain them are diminishing in supply.

To convert any legacy system to a database centric process, the flat files in the legacy system need to be converted to tables using any of the extract, transform, load (ETL) tools and then apply the method described herein. In one example use of the present invention, a legacy system that processes 15 billion rows every month on mainframe was converted to a database driven process in Sybase IQ database.

BRIEF DESCRIPTION OF THE DRAWINGS

Preferred embodiments of the present invention will now be described by way of example with reference to the accompanying drawings:

FIGS. 4A-4G, 5A-5L, and 6A-6I show sample tables for use with the batch process of FIGS. 1-3.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

One preferred embodiment of the present invention is implemented via software code shown below. The software code is subject to the "Copyright Notice and Authorization" stated above.

Every batch process has at least one master file (MF) and a transaction file (TF), or two or more transaction files.

This is true for tables as well. Master files and transaction files must be sorted in the same order on the same set of keys for successful matching. Every row in the master file is paired with every row in the transaction file. If a match is found, it is processed and updated based on the business rules. Sequential reading is essential for this process so that the balance from the current row will be carried over to the next row to be processed. The method described herein is the only way to do this process without reading one row at a time from both the master and transaction files (or tables). The method described herein processes one row per account/key simultaneously.

The principle idea in the batch process described herein is that an additional key is added within each natural key on both tables/files for identifying the sequence of the rows in MFs and TFs. During each loop through the process, the sequence to match on MFs and TFs is recalculated.

Figure 1:
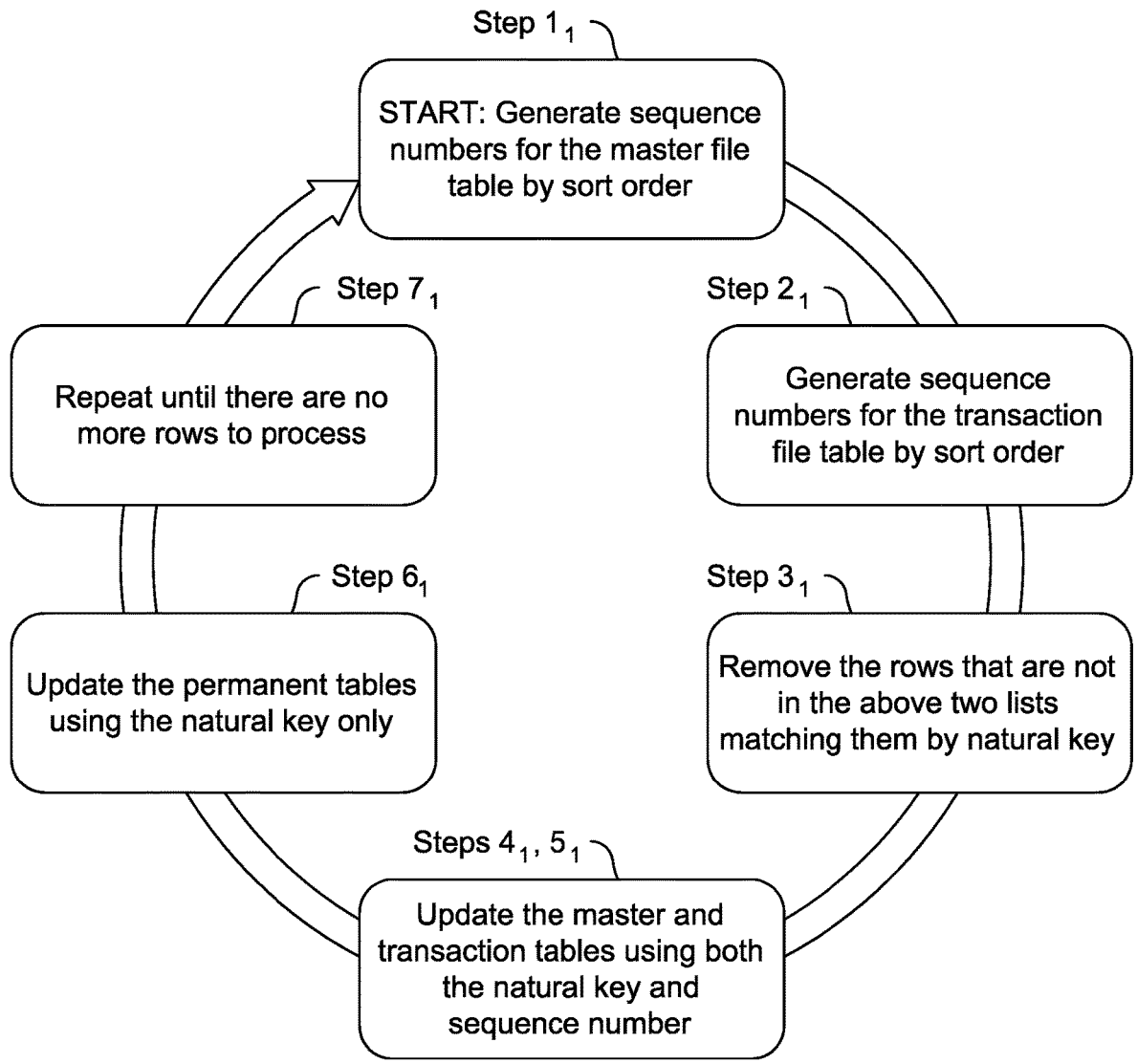
FIGS. 1 and 2 are flowcharts that illustrate preferred embodiments of the present invention.

Referring to FIG. 1, the following steps disclose one preferred embodiment of the process. Similar results can be achieved with less or more steps, as long as the principle idea of adding additional keys to identify the order is accomplished. Details for these steps depend on the requirements of the process but they are similar in nature for all MF and TF processing.

Step $1_1$

Add a unique key to the master table, matching the order to the rows to be processed and insert the result to a temporary table This SELECT must have a condition to eliminate the rows that are already processed. The example below is the BALANCE_AMT.

SELECT ACCOUNT_KEY, COL1, TRANS_DT, COL3, TRANS_BALANCE_AMT, . . . ROW_NUMBER( )OVER (PARTITION BY ACCOUNT_KEY,TRANS_DT . . . ) SEQ INTO #TEMPDEBIT_INIT_SEQ FROM MF_DEBIT_TABLE WHERE ASSMNT_AMT>0 AND TRANS_BALANCE_AMT>0.

In this example, the SQL Windows function is used to generate a row number for the sequence of rows to process the order.

Step $2_1$

Add a unique key to the transaction table, matching the order the rows to be processed, and insert the result to another temp table. This SELECT also must have a condition to eliminate the rows that are already processed. The example below is the BALANCE_AMT. Note that the balance_amt is stored as '-' in the transaction table and that the <0 indicates that a credit amount exists in this account.
SELECT ACCOUNT_KEY, COL1, TRANS_DT, COL3, TRANS_BALANCE_AMT, . . . ROW_NUMBER( )OVER (PARTITION BY ACCOUNT_KEY ORDER BY ACCOUNT_KEY,TRANS_DT . . . ) SEQ INTO #TEMPCREDIT_INIT_SEQ FROM TF_CREDIT_TABLE WHERE PAYMENT_AMT*-1>0 AND TRANS_BALANCE_AMT<0.

In SQL Windows functions, PARTITION BY is done on the natural key of the data. ORDER BY columns are based on business rules for match order. It is very important for any batch process to have the same key columns and same sort columns for both MF and TF tables/files.

Step $3_1$

Remove the rows from the TF temp table if the account (or key) is not in the MF temp table and also remove the rows from the MF temp table if the account is not in the TF temp table. You need to select the accounts/keys which have at least one row to process in both tables.
DELETE FROM #TEMPDEBIT_INIT_SEQ WHERE ACCOUNT_KEY NOT IN (SELECT ACCOUNT_KEY FROM #TEMPCREDIT_INIT_SEQ).
DELETE FROM #TEMPCREDIT_INIT_SEQ WHERE ACCOUNT_KEY NOT IN (SELECT ACCOUNT_KEY FROM #TEMPDEBIT_INIT_SEQ).

The remaining steps in this process depend on the requirements (business rules). One may or may not need all the steps below in all batch process programs. The steps above already identified the rows to match/update in the process by adding additional key (SEQ) within every account. If one joins the two temp tables above with the natural key (ACCOUNT_KEY) and the SEQ generated by the SQL PARTITION BY function, this will get only one row (if one uses AND SEQ=1 in the condition). This will be the first row to be processed in each account. The following steps demonstrate how this idea applies to business rules in a specific batch process requirement.

Step $4_1$

Select all rows from both temp tables where SEQ=1 and insert it into new temp tables. Keep a copy of these tables to store the original amounts after the first tables are updated.
SELECT * INTO #TEMPDEBIT_SEQ FROM #TEMPDEBIT_INIT_SEQ WHERE SEQ=1; SELECT * INTO #TEMPCREDIT_SEQ FROM #TEMPCREDIT_INIT_SEQ WHERE SEQ=1; SELECT * INTO #TEMPDEBIT_SEQ_COPY FROM #TEMPDEBIT_SEQ; SELECT * INTO #TEMPCREDIT_SEQ_COPY FROM #TEMPCREDIT_SEQ;
Find the row counts in both tables. This is to control the number of loops later. SET @DEBITCOUNT=(SELECT COUNT(*) FROM #TEMPDEBIT_SEQ); SET @CREDITCOUNT=(SELECT COUNT(*) FROM #TEMPCREDIT_SEQ);

Step $5_1$

Perform all updates to the #TEMPDEBIT_SEQ and #TEMPCREDIT_SEQ tables based on the business rules. Use copies of the tables if needed for applying the business rules.
UPDATE #TEMPDEBIT_SEQ SET D.TRANS_BALANCE_ AMT=D.TRANS_BALANCE_AMT+C.TRANS_BALANCE_AMT FROM #TEMPDEBIT_SEQ D, #TEMPCREDIT_SEQ_COPY C WHERE D.EMIS_TIF_KEY=C.EMIS_TIF_KEY=C.EMIS_TIF_KEY AND D.SEQ=C.SEQ AND D.TRANS_BALANCE_AMT>=-1*C.TRANS_BALANCE_AMT;
COMMIT;
UPDATE #TEMPCREDIT_SEQ SET C.TRANS_BALANCE_AMT=0, C.CREDIT_FULLY_USED='Y' FROM #TEMPCREDIT_SEQ C, #TEMPDEBIT_SEQ_COPY D WHERE C.EMIS_TIF_KEY=D.EMIS_TIF_KEY AND C.SEQ=D.SEQ AND D.TRANS_BALANCE_AMT>=-1*C.TRANS_BALANCE_AMT;
COMMIT;
UPDATE #TEMPCREDIT_SEQ SET C.TRANS_BALANCE_ AMT=C.TRANS_BALANCE_AMT+D.TRANS_BALANCE_AMT FROM #TEMPCREDIT_SEQ C, #TEMPDEBIT_SEQ_COPY D WHERE C.EMIS_TIF_KEY=D.EMIS_TIF_KEY AND C.SEQ=D.SEQ AND C.TRANS_BALANCE_AMT< >0 AND C.TRANS_BALANCE_AMT*-1>=D.TRANS_BALANCE_AMT;
COMMIT;
UPDATE #TEMPDEBIT_SEQ SET D.TRANS_BALANCE_AMT=0, D.DEBIT_FULLY_PAID='Y' FROM #TEMPDEBIT_SEQ D, #TEMPCREDIT_SEQ_COPY C WHERE C.EMIS_TIF_KEY=D.EMIS_TIF_KEY AND C.SEQ=D.SEQ AND C.TRANS_BALANCE_AMT< >0 AND C.TRANS_BALANCE_AMT*-1>=D.TRANS_BALANCE_AMT;
COMMIT;

Step $6_1$

Use natural keys only to update the original tables in the database with the data in the temp tables above.
UPDATE MF_DEBIT_TABLE SET TRANS_BALANCE_AMT=TEMPD.TRANS_BALANCE_AMT FROM MF_DEBIT_TABLE D, #TEMPDEBIT_SEQ TEMPD WHERE D.EMIS_TIF_KEY=TEMPD.EMIS_TIF_KEY AND D.TRAN_SEQ=TEMPD.EMIS_TIF_KEY AND D.TRAN_SEQ=TEMPD.TRAN_SEQ;
UPDATE SET TRANS_BALANCE_AMT=TEMPC.TRANS_ BALANCE_AMT FROM TF_CREDIT_TABLE C, #TEMPCREDIT_SEQ TEMPC WHERE C.EMIS_TIF_KEY=TEMPC.EMIS_TIF_KEY AND C.TRAN_SEQ=TEMPC.TRAN_SEQ;
One row in each account in the MF table is processed if there is a Transaction row in the TF table for the account/key. If there are 30 million accounts/keys in the transaction table, 30 million transaction rows are processed from the TF and MF tables simultaneously.

Step $7_1$

Drop all #temp tables created.
DROP TABLE #TEMPCREDIT_INIT_SEQ; DROP TABLE #TEMPDEBIT_NIT_SEQ; DROP TABLE #TEMPCREDIT_SEQ; DROP TABLE #TEMPDEBIT_SEQ; DROP TABLE #TEMPCREDIT_SEQ_COPY; DROP TABLE #TEMPDEBIT_SEQ_COPY; Loop through steps 1 to 7 until there are no more rows to process in the MF or TF table (until @CREDITCOUNT=0 or @DEBITCOUNT=0).

The number of rows to process decreases in every loop of the process. The performance of this process and the benchmark results for each loop are listed below for test dataset tables in a specific system with the SAP SYBASE IQ 16 database.
7133405 rows affected
Execution time: 55.075 seconds The statistics above show that 7.1 million rows were updated on the TF table and MF table within 55 seconds. This was done in the first loop of the process.
4383786 rows affected
Execution time: 109.383 seconds The statistics above show that 4.3 million rows on both tables were updated in the second loop of the process. This means that a total of 11.4 (7.1+4.3) million rows were processed in 109 seconds. Note that the execution time shows the total time (2 loops), but the number of rows affected shows the count in the last update process which is the last update in the second loop.

Running the test for 10 loops averaged a performance of 3 million rows per minute for the tested tables.

The batch processing technique described above will revolutionize the current batch processing methods in the industry. The method assigns new temporary keys to the files/tables used to establish the processing order and stores the new tables in temporary tables. It then applies business rules to the tables/files joining with the natural key and the new temporary key. The process then updates the original table using natural keys. This is repeated until all rows are processed. The method can update one row within every account instead of one row within the entire file/table for each update, which is what the current method does. The current (prior art) method known as "cursor processing" can only process several thousand rows per minute while the method can process several million rows per minute.

Figure 2:
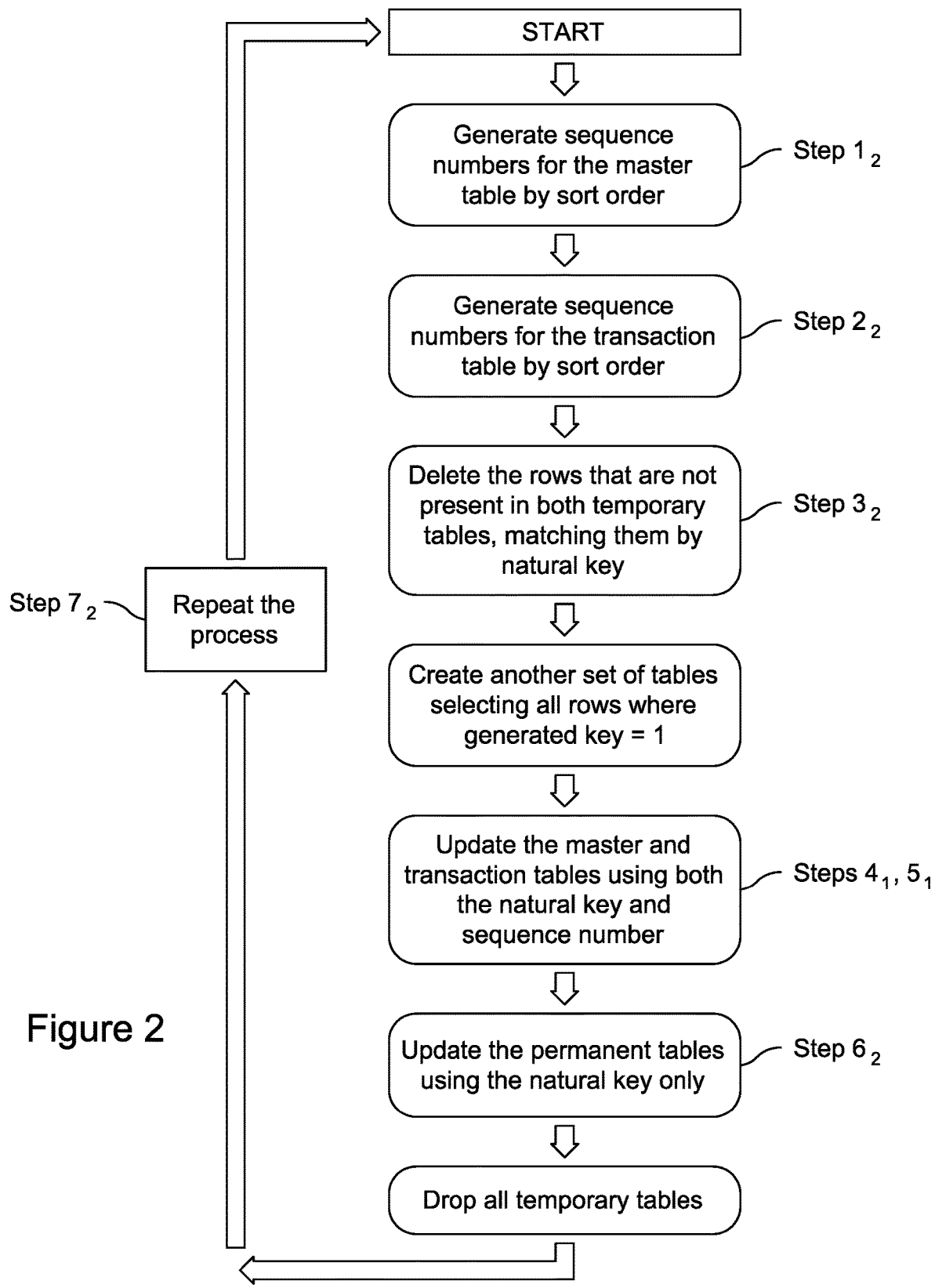

FIG. 2 is a more detailed flowchart representing the same process described above, and illustrated in FIG. 1, with two additional explanatory steps.

Step $1_2$: Generate sequence numbers in the master table by sort order.

Step $2_2$: Generate sequence numbers in the transaction table by sort order.

Step $3_2$: Delete the rows that are not present in both temporary tables, matching them by natural key.

Added explanatory step: Create another set of tables selecting all rows where generated key=1.

Steps $4_2$, $5_2$: Update the master and transaction tables using both the natural key and sequence number.

Step $6_2$: Update the permanent tables using only the natural key only.

Added explanatory step: Drop all temporary tables.

Step $7_2$: Repeat the process.

The same process repeats until all rows in the Master Table or Transaction Table or both are processed. Rows that are already processed are excluded from the next loop by using the appropriate selection criteria.

Figure 3:
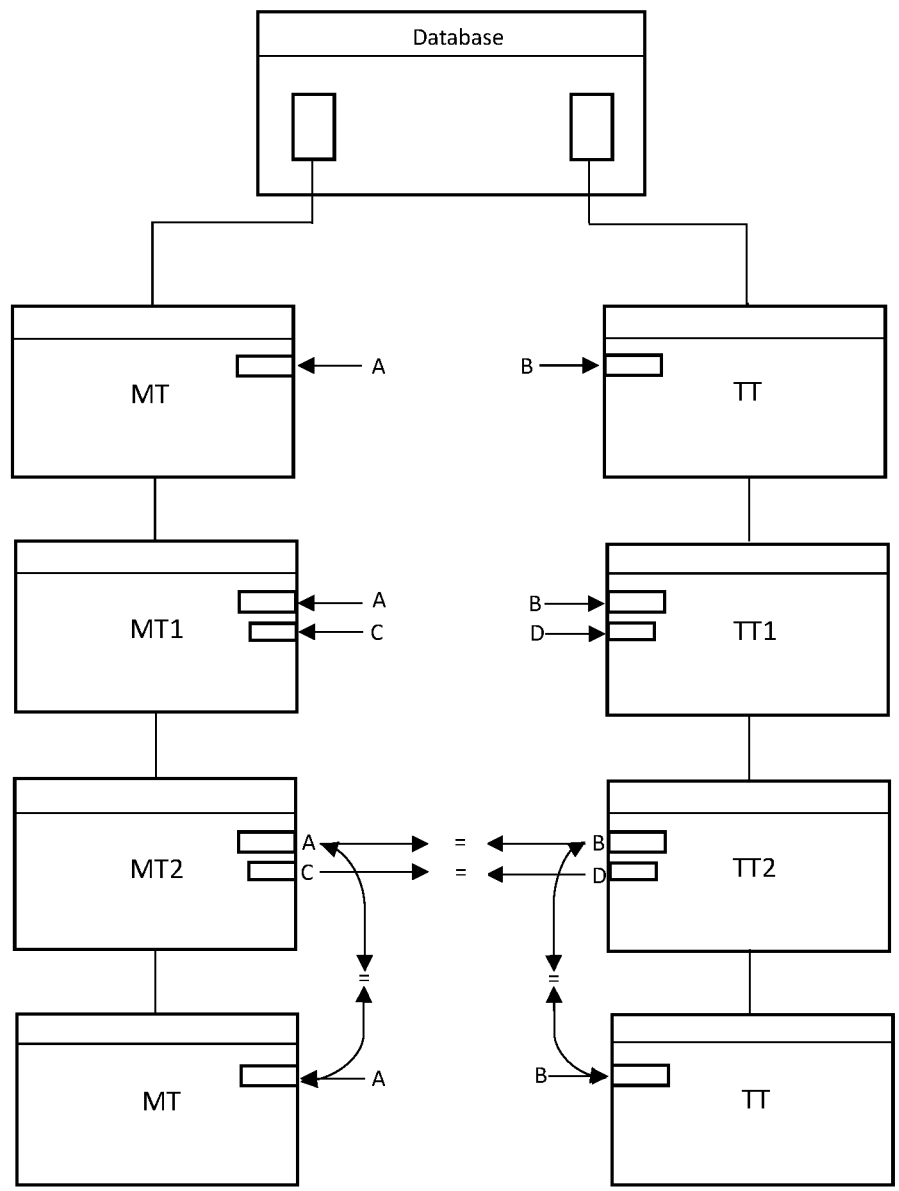
FIG. 3 is an architectural (schematic) diagram with tables used in the process.

An alternative (modified) embodiment of Step 5 combines first and second SQL statements into a single statement and combines third and fourth SQL statements into another single SQL statement. This reduces the lines of code and improves the performance. The modified step 5 is given below:

Perform all updates to the #TEMPDEBIT_SEQ and #TEMPCREDIT_SEQ tables based on business rules.
UPDATE #TEMPDEBIT_SEQ
  SET D.BALANCE_AMT=CASE
    WHEN D.BALANCE_AMT>=-1*C.BALANCE_AMT THEN D.BALANCE_AMT+C.BALANCE_AMT
    WHEN C.BALANCE_AMT*-1>D.BALANCE_AMT THEN 0
    END,
  D.APPLIED_AMT=CASE
    WHEN D.BALANCE_AMT>=-1*C.BALANCE_AMT THEN-1*C.BALANCE_AMT
    WHEN C.BALANCE_AMT*-1>D.BALANCE_AMT THEN D.BALANCE_AMT
    END
  FROM #TEMPDEBIT_SEQ D, #TEMPCREDIT_SEQ COPY C
  WHERE D.EMIS_TIF_KEY=C.EMIS_TIF_KEY AND D.SEQ=C.SEQ AND D.BALANCE_AMT< >0;
COMMIT;
UPDATE #TEMPCREDIT_SEQ
  SET C.BALANCE_AMT=CASE
    WHEN D.BALANCE_AMT>=-1*C.BALANCE_AMT THEN 0
    WHEN C.BALANCE_AMT*-1>D.BALANCE_AMT THEN C.BALANCE_AMT+D.BALANCE_AMT
    END,
  C.APPLIED_AMT=CASE
    WHEN D.BALANCE_AMT>=-1*C.BALANCE_AMT THEN-1*C.BALANCE_AMT
    WHEN C.BALANCE_AMT*-1>D.BALANCE_AMT THEN D.BALANCE_AMT
    END
  FROM #TEMPCREDIT_SEQ C, #TEMPDEBIT_SEQ COPY D
  WHERE C.EMIS_TIF_KEY=D.EMIS_TIF_KEY AND C.SEQ=D.SEQ AND C.BALANCE_AMT< >0;
COMMIT;

FIG. 3 shows an architectural (schematic) diagram with tables used in the process. The base tables reside in the database. The Master Table (MT) and the Transaction Table (TT) are the base tables. Both tables have natural keys to identify the account and transactions associated with it. The Master Table (MT) contains all debit transactions and the Transaction Table (TT) contains all credit transactions. The Master Table key is identified as A in FIG. 3 and Transaction Table key is identified as B in FIG. 3.

Table MT1 is created after the first step of the process and table TT1 is created on the execution of step 2. Note the additional key columns C and D generated in these tables. Step 3 is applied on the same table which deletes all rows without a matching natural key on the TT1 and MT1 tables.

Tables MT2 and TT2 are created by selecting the rows with a generated key value of 1. Step 4 described above gives the details for this process. Note that this step is optional. It makes the SQL simpler in syntax for updates in the following step.

Step 5 is applied on table MT2 and TT2 by matching both natural keys and generated keys. This is where all business rules are applied.

Step 6 updates the original tables in the database (MT and TT) matching the natural key only. The generated key is ignored. If a unique identifier for a row is not available in the original tables, the row number will be used as an identifier and will be added as a column to the tables.

The process mentioned above is the only batch process that takes advantage of the Massive Parallel Processing (MPP) capabilities of column store databases.

The process can be used in any set of tables where sequential processing is required for matching data between two or more tables, datasets, or views.

Sample use cases are described below.

Example 1

Batch processing is performed on transactions in multiple tables. The multiple tables include a first and a second permanent table, and a first and a second temporary table which are generated from the respective first and second permanent tables. Each table has a plurality of transactions posted thereto in respective rows of the tables. Each transaction is associated with a natural key, and each transaction has at least (i) a transaction date, (ii) a transaction amount, and (iii) a transaction identifier. In one preferred embodiment, the natural key is an account number. However, other types of natural keys are within the scope of the present invention. The method operates as follows:

(a) For each of the temporary tables, sequence numbers are generated for each set of transactions in a respective table that has the same natural key. The sequence numbers are ordered by their respective transaction date. The sequence numbers are natural numbers beginning with one.

(b) Ignore for further processing any rows in the first temporary table that do not have transactions with the same natural key as a transaction in the second table, and ignore for further processing any rows in the second temporary table that do not have transactions with the same natural key as a transaction in the first table. In one preferred embodiment, the rows are ignored for further processing by deleting the respective rows from the respective temporary tables.

(c) For all rows in the first and second temporary tables wherein the sequence number equals one, the transaction amounts are updated for each natural key in each of the first and second temporary tables. The updated transaction amounts in each of the first and second temporary tables will have either a zero, or non-zero value.

(d) Update the transaction amounts for each natural key in the first and second permanent tables using any respectively updated transaction amounts in the first and second temporary tables. The updating in the first and second permanent tables uses the natural keys and the transaction identifiers to identify the appropriate rows in the first and second permanent tables for updating. Together, the natural keys and the transaction identifiers define a unique natural key.

(e) Iteratively repeat the steps above (steps (a)-(d)). The iteration includes regenerating the first and second temporary tables with any rows in the corresponding first and second permanent tables wherein the transaction amount is a non-zero value. The regenerated first and second temporary tables are then used in steps (a)-(d). The iteration repeats until either the first or second temporary table has no further rows wherein the transaction amount is a non-zero value.

In one preferred embodiment of the method described above, the first and second permanent and temporary tables are each transaction tables.

The transaction date may simply be just a date, or it may also include a date and time (date/time stamp), both of which are collectively referred to as a "transaction date." The nature and circumstances of the transaction will determine whether a time value will be included in the transaction date.

FIGS. 4A-4G show selected table entries and changes made to the table entries as a result of the multi-step processes shown in FIGS. 1 and 2 for Example 1. For illustration purposes, some entries are shown with strikethroughs, indicating the previous and new values on the same figure, instead of showing the changes in new tables on separate figures. There are three loops (2 iterations) in this example because the maximum sequence number for the rows of data is 3. To simplify the illustration, only the first and second temporary tables are shown in these figures.

Example 2

Batch processing is performed in transactions in multiple tables. This embodiment differs from Example 1 because the first tables do not maintain any transactions, but only have an account balance that is updated using transactions in the second tables.

The multiple tables include a first and a second permanent table, and a first and a second temporary table which are generated from the respective first and second permanent tables. The first permanent and first temporary tables have a plurality of account balances posted thereto in respective rows of the tables. Each account balance is associated with a natural key. The second permanent and second temporary tables have a plurality of transactions posted thereto in respective rows of the tables. Each transaction is associated with a natural key, and each transaction has at least (i) a transaction date, (ii) a transaction amount, and (iii) a transaction identifier. In one preferred embodiment, the natural key is an account number. However, other types of natural keys are within the scope of the present invention. The method operates as follows:

(a) For the second temporary table, sequence numbers are generated for each set of transactions in the second temporary table that has the same natural key. The sequence numbers are ordered by their respective transaction date. The sequence numbers are natural numbers beginning with one.

(b) Ignore for further processing any rows in the first temporary table that do not have account balances with the same natural key as a transaction in the second temporary table, and ignore for further processing any rows in the second temporary table that do not have transactions with the same natural key as an account balance in the first temporary table. In one preferred embodiment, the rows are ignored for further processing by deleting the respective rows from the respective temporary tables.

(c) For all rows in the second temporary table wherein the sequence number equals one, update the transaction amount for each natural key in the second temporary table, and update the account balance for each natural key in the first temporary table. The updated transaction amounts and account balances in each of the first and second temporary tables will have either a zero, or non-zero value.

(d) Update the account balance for each natural key in the first permanent table using any updated account balances in the first temporary table, and update the transaction amount for each natural key in the second permanent table using any updated transaction amounts in the second temporary table. The updating in the first permanent table uses the natural keys of the first permanent table and the first temporary table to identify the appropriate rows in the first permanent tables for updating. The updating in the second permanent table uses the natural keys and the transaction identifiers of the second temporary table and the second permanent table to identify the appropriate rows in the second permanent tables for updating. Together, the natural keys and the transaction identifiers define a unique natural key.

(e) Iteratively repeat the steps above (steps (a)-(d)). The iteration includes regenerating the first temporary table with any rows in the corresponding first permanent table wherein the account balance is a non-zero value, and regenerating the second temporary table with any rows in the corresponding second permanent table wherein the transaction amount is a non-zero value. The regenerated first and second temporary tables are used in steps (a)-(d). The iteration repeats until either the first temporary table has no further rows wherein the account balance is a non-zero value, or the second temporary table has no further rows wherein the transaction amount is a non-zero value.

In one preferred embodiment of the method described above, the first and second permanent and temporary tables are each transaction tables.

In one alternative embodiment, prior to step (b), for the first temporary table, a sequence number of one is assigned for each row in the table, and the updating in step (c) occurs for all rows in the first and second temporary table wherein the sequence number equals one. This embodiment is optional because where there is only row per account, it is not necessary to create sequence numbers. However, this alternative embodiment allows the same programming rules to be applied as in Example 1, namely, by selecting all rows for updating by identifying for rows having a sequence number of equal to one.

The transaction date may simply be just a date, or it may also include a date and time (date/time stamp), both of which are collectively referred to as a "transaction date." The nature and circumstances of the transaction will determine whether a time value will be included in the transaction date.

FIGS. 5A-5L show selected table entries and changes made to the table entries for Example 2. There are three loops (2 iterations) in this example because the maximum sequence number for the rows of data is 3. To simplify the illustration, only the first and second temporary tables are shown in these figures.

Example 3

This embodiment is a more generic version of Example 2 because the table data may be any type of structured data, and any type of structured data transactions. Structured data refers to any data that resides in a fixed field within a row (record) or file. This includes data contained in relational databases and spreadsheets. Accordingly, a structured data transaction refers to an entry made in a table, such as a child table, here a second temporary and second permanent table, and which is subsequently populated to a parent table, here, a first temporary and first permanent table.

In structured data, one defines the fields of data to be stored and how that data will be stored, including the data type (e.g., numeric, alphabetic, name, date, address), and any restrictions on the data input (e.g., number of characters).

In one embodiment, the structured data and structured data transactions include financial data, such as shown in Example 2. However, in other embodiments, the structured data and structured data transactions include non-financial alphanumeric data, as shown in FIGS. 6A-6I.

Batch processing is performed on structured data in multiple tables. The multiple tables include a first and a second permanent table, and a first and a second temporary table which are generated from the respective first and second permanent tables. The first permanent and first temporary tables have one or more fields of structured data posted thereto in respective rows of the tables. The one or more fields of structured data are associated with a natural key. The second permanent and second temporary tables have a plurality of structured data table entries posted thereto in respective rows of the tables. Each structured data table entry is associated with a natural key. The method operates as follows:

(a) For the second temporary table, sequence numbers are generated for each set of structured data table entries in the second temporary table that has the same natural key. The sequence numbers are ordered by a sort order of one or more columns of the second temporary table in addition to the natural key. That is, the natural key and one or more other columns of the second temporary table are used for the sort order. The sequence numbers are natural numbers beginning with one.

(b) Ignore for further processing any rows in the first temporary table that do not have structured data with the same natural key as a structured data table entry in the second temporary table, and ignore for further processing any rows in the second temporary table that do not have structured data table entries with the same natural key as structured data in the first temporary table. In one preferred embodiment, the ignoring occurs by deleting the respective rows from the respective temporary tables.

(c) For all rows in the second temporary table wherein the sequence number equals one, update the structured data for each natural key in the first temporary table with the corresponding structured data table entries having the same natural key in the second temporary table.

(d) Mark the row of each updated structured data table entry in the second temporary file with a status indicating that the structured data table entry was processed.

(e) Update the structured data for each natural key in the first permanent table using any updated structured data in the first temporary table, and update the structured data table entry for each natural key in the second permanent table using any updated structured data table entries in the second temporary table. The updating in the first permanent table uses the natural keys in the first permanent table and first temporary table to identify the appropriate rows in the first permanent tables for updating. The updating in the second permanent table uses the natural keys and one of the columns of the second temporary table and the second permanent table to identify the appropriate rows in the second permanent tables for updating.

(f) Iteratively repeat the steps above (steps (a)-(e)). The iteration includes regenerating the first temporary table with the updated rows of the first permanent table, and regenerating the second temporary table with any rows in the corresponding second permanent table wherein the structured data table entry is not yet marked as being processed. The regenerated first and second temporary tables are used in steps (a)-(e). The iteration repeats until the second temporary table has no further rows with a structured data table entry that is not yet marked as being processed.

In one preferred embodiment, the natural key is a unique identifier of an entity, such as a social security number.

In one preferred embodiment, each structured data table entry has a date stamp, the second temporary table thereby having a date stamp column. The sort order uses the date stamp column of the second temporary table. The updating in the second permanent table uses the natural keys and the date stamp column of the second temporary table and the second permanent table to identify the appropriate rows in the second permanent tables for updating. The date stamp may be a date that an event occurred, or it may be a date that the table entry was made. The date stamp may simply be just a date, or it may also be a date/time stamp, both of which are collectively referred to as a "date stamp." The nature and circumstances of the structured data will determine what date to use for the date stamp, and whether a time value will be included in the date stamp.

Regarding each of the examples above, the table regeneration may automatically incorporate the step of ignoring for further processing non-matching rows by natural key. That is, these rows may be ignored (e.g., deleted) at the same time that the first and second temporary tables are regenerated. These two approaches are equivalent to one another because they require performing the same processing, and achieve the same result.

FIGS. 6A-6I show selected table entries and changes made to the table entries for Example 3. There are three loops (2 iterations) in this example because the maximum sequence number for the rows of data is 3. To simplify the illustration, only the first and second temporary tables are shown in these figures.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for performing a batch process on transactions and structured data in multiple tables, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Additional Considerations

A. First and Second Tables

In the examples described above, the first tables are permanent tables and the second tables are temporary tables. However, the first tables are more broadly considered to be "source tables" and the second tables are more broadly considered to be "processing tables." Thus, the scope of the present invention includes first and second tables that are not necessarily permanent and temporary tables.

B. Additional Tables

In the examples described above, only one secondary table is illustrated. However, there may be multiple sets of secondary tables. If so, the same steps described above for each of the examples are performed for each set of secondary tables. Consider, for example, Example 3 wherein there are two different sets of secondary permanent (e.g., source) and secondary temporary (e.g., processing) tables. The steps are performed for the first set of secondary permanent and secondary temporary tables until second temporary table of the first set has no further rows with a structured data table entry that is not yet marked as being processed. Then the same steps are performed for the second set of secondary permanent and secondary temporary tables until second temporary table of the second set has no further rows with a structured data table entry that is not yet marked as being processed. If there are additional sets of secondary tables, the steps are repeated again using the additional sets.

C. Tables and Views

Tables can be logical or physical structures. A table can be constructed as a physical table which resides in physical storage such as hard drives, or views, which are virtual tables defined by a query, or temporary tables which reside in memory. The scope of the present invention covers all such table equivalents.

D. Sort Order

Sort order is defined by the business rules of the batch process. The sort order is not necessarily limited to a single column, such as a time stamp, but may have as many columns or combination of columns as defined by the business rules. An example of sort order is when statistics on where specific products or sold geographically are required. In this example, the sort order would be the combination of the Product id and then the Zip code of the purchase. Another example is using a customer id, transaction id, and transaction date to reconcile and aggregate consumption of a customer in the utility industry.

E. Sequence Values

The examples provided above, and illustrated in the figures, use sequence numbers. However, the sequence number does not necessarily have to be a number, per se. More broadly, the sequence feature may be implemented by any set of sequence values, which may include numbers, alphanumerics, or characters that can be "sequenced." Thus, a set of sequence values may be any set of values (e.g., numbers, alphanumerics, or characters) that can be generated in a sequential order. Examples include the following:

(1, 2, 3, 4, 5, . . . )
(A1, A2, A3, A4 . . . ),
(1.1, 1.2, 1.3, . . . ) and
(AAA, AAB, AAC, . . . , ZZZ).

In each of these examples the resulting set of values are in sequential order. Stated another way, each set of sequence values begins with a lowest value, followed by sequentially increasing values. In the embodiments above, the sequence numbers are natural numbers beginning with one, and for each loop in the process, only the rows having a sequence number equal to "one" are processed. However, in embodiments wherein the sequence values are not natural numbers beginning with one, for each loop in the process, only the rows having a sequence value that equals the lowest value in the set are processed. In addition, the sequence values do not necessarily need to have a lowest value, followed by sequentially increasing values, but instead may have a highest value, followed by sequentially decreasing values. In this alternative scenario, the updating occurs for the structured data wherein the sequence value has the highest value, not the lowest value. These two embodiments are equivalent to each other, and accomplish the same function.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method for performing a batch process on transactions in multiple tables, the multiple tables including a first and a second source table, and a first and a second processing table which are generated from the respective first and second source tables, each table having a plurality of transactions posted thereto in respective rows of the tables, each transaction being associated with a natural key, and each transaction having at least (i) a transaction date, (ii) a transaction amount, and (iii) a transaction identifier, the method comprising:

(a) for each of the processing tables, generating sequence values for each set of transactions in a respective table that has the same natural key, the sequence values being ordered by their respective transaction date, the sequence values beginning with (i) a lowest value, followed by sequentially increasing values, or (ii) a highest value, followed by sequentially decreasing values;

(b) ignoring for further processing any rows in the first processing table that do not have transactions with the same natural key as a transaction in the second processing table, and ignoring for further processing any rows in the second processing table that do not have transactions with the same natural key as a transaction in the first processing table;

(c) for all rows in the first and second processing tables wherein the sequence value equals (i) the lowest value for sequentially increasing values, or (ii) the highest value for sequentially decreasing values, updating the transaction amounts for each natural key in each of the first and second processing tables, the updated transaction amounts in each of the first and second processing tables being either a zero, or non-zero value;

(d) updating the transaction amounts for each natural key in the first and second source tables using any respectively updated transaction amounts in the first and second processing tables, wherein the updating in the first and second source tables uses the natural keys and the transaction identifiers to identify the appropriate rows in the first and second source tables for updating; and (e) iteratively repeating steps (a)-(d), the iteration including regenerating the first and second processing tables with any rows in the corresponding first and second source tables wherein the transaction amount is a non-zero value, the regenerated first and second processing tables being used in steps (a)-(d), wherein the iteration repeats until either the first or second processing table has no further rows wherein the transaction amount is a non-zero value.

2. The method of claim 1 wherein the sequence values begin with a lowest value, followed by sequentially increasing values, and the sequence values are sequence numbers that are natural numbers beginning with a lowest value of one.

3. The method of claim 1 wherein the natural key is an account number.

4. The method of claim 1 wherein the first and second source and processing tables are each transaction tables.

5. The method of claim 1 wherein the ignoring in step (b) occurs by deleting the respective rows from the respective processing tables.

6. The method of claim 1 wherein the first and second source tables are permanent tables, and the first and second processing tables are temporary tables.

7. A method for performing a batch process on transactions in multiple tables, the multiple tables including a first and a second source table, and a first and a second processing table which are generated from the respective first and second source tables, the first source and first processing tables having a plurality of account balances posted thereto in respective rows of the tables, each account balance being associated with a natural key, the second source and second processing tables having a plurality of transactions posted thereto in respective rows of the tables, each transaction being associated with a natural key, and each transaction having at least (i) a transaction date, (ii) a transaction amount, and (iii) a transaction identifier, the method comprising:
  (a) for the second processing table, generating sequence values for each set of transactions in the second processing table that has the same natural key, the sequence values being ordered by their respective transaction date, the sequence values beginning with (i) a lowest value, followed by sequentially increasing values, or (ii) a highest value, followed by sequentially decreasing values;
  (b) ignoring for further processing any rows in the first processing table that do not have account balances with the same natural key as a transaction in the second processing table, and ignoring for further processing any rows in the second processing table that do not have transactions with the same natural key as an account balance in the first processing table;
  (c) for all rows in the second processing table wherein the sequence value equals (i) the lowest value for sequentially increasing values, or (ii) the highest value for sequentially decreasing values, updating the transaction amount for each natural key in the second processing table, and updating the account balance for each natural key in the first processing table, the updated transaction amounts and account balances in each of the first and second processing tables being either a zero, or non-zero value;
  (d) updating the account balance for each natural key in the first source table using any updated account balances in the first processing table, and updating the transaction amount for each natural key in the second source table using any updated transaction amounts in the second processing table,
    wherein the updating in the first source table uses the natural keys of the first source table and the first processing table to identify the appropriate rows in the first source tables for updating, and wherein the updating in the second source table uses the natural keys and the transaction identifiers of the second processing table and the second source table to identify the appropriate rows in the second source tables for updating; and
  (e) iteratively repeating steps (a)-(d), the iteration including regenerating the first processing table with any rows in the corresponding first source table wherein the account balance is a non-zero value, and regenerating the second processing table with any rows in the corresponding second source table wherein the transaction amount is a non-zero value, the regenerated first and second processing tables being used in steps (a)-(d), wherein the iteration repeats until either the first processing table has no further rows wherein the account balance is a non-zero value, or the second processing table has no further rows wherein the transaction amount is a non-zero value.

8. The method of claim 7 wherein the sequence values begin with a lowest value, followed by sequentially increasing values, and the sequence values are sequence numbers that are natural numbers beginning with a lowest value of one.

9. The method of claim 7 further comprising:
  (f) prior to step (b), for the first processing table, assigning a sequence value equal to the lowest value for each row in the table, wherein the updating in step (c) occurs for all rows in the first and second processing table wherein the sequence value is the lowest value.

10. The method of claim 7 wherein the natural key is an account number.

11. The method of claim 7 wherein the first and second source and processing tables are each transaction tables.

12. The method of claim 7 wherein the ignoring in step (b) occurs by deleting the respective rows from the respective processing tables.

13. The method of claim 7 wherein the first and second source tables are permanent tables, and the first and second processing tables are temporary tables.

14. A method for performing a batch process on structured data in multiple tables, the multiple tables including a first and a second source table, and a first and a second processing table which are generated from the respective first and second source tables, the first source and first processing tables having one or more fields of structured data posted thereto in respective rows of the tables, the one or more fields of structured data being associated with a natural key, the second source and second processing tables having a plurality of structured data table entries posted thereto in respective rows of the tables, each structured data table entry being associated with a natural key, the method comprising:
  (a) for the second processing table, generating sequence values for each set of structured data table entries in the second processing table that has the same natural key, the sequence values being ordered by a sort order of one or more columns of the second processing table other than the natural key, the sequence values beginning with (i) a lowest value, followed by sequentially increasing values, or (ii) a highest value, followed by sequentially decreasing values;
  (b) ignoring for further processing any rows in the first processing table that do not have structured data with the same natural key as a structured data table entry in the second processing table, and ignoring for further processing any rows in the second processing table that do not have structured data table entries with the same natural key as structured data in the first processing table;
  (c) for all rows in the second processing table wherein the sequence value equals (i) the lowest value for sequentially increasing values, or (ii) the highest value for sequentially decreasing values, updating the structured data for each natural key in the first processing table with the corresponding structured data table entries having the same natural key in the second processing table;
  (d) marking the row of each updated structured data table entry in the second processing table with a status indicating that the structured data table entry was processed;
  (e) updating the structured data for each natural key in the first source table using any updated structured data in the first processing table, and updating the structured data table entry for each natural key in the second source table using any updated structured data table entries in the second processing table,
- wherein the updating in the first source table uses the natural keys in the first source table and first processing table to identify the appropriate rows in the first source tables for updating, and wherein the updating in the second source table uses the natural keys and one of the columns of the second processing table and the second source table to identify the appropriate rows in the second source tables for updating; and
- (f) iteratively repeating steps (a)-(e), the iteration including regenerating the first processing table with the updated rows of the first source table, and regenerating the second processing table with any rows in the corresponding second source table wherein the structured data table entry is not yet marked as being processed, the regenerated first and second processing tables being used in steps (a)-(e), wherein the iteration repeats until the second processing table has no further rows with a structured data table entry that is not yet marked as being processed.

15. The method according to claim 14 wherein the sequence values begin with a lowest value, followed by sequentially increasing values, and the sequence values are sequence numbers that are natural numbers beginning with a lowest value of one.

16. The method of claim 14 wherein the structured data and structured data transactions include non-financial alphanumeric data.

17. The method of claim 14 wherein the natural key is a unique identifier of an entity.

18. The method of claim 14 wherein the ignoring in step (b) occurs by deleting the respective rows from the respective processing tables.

19. The method of claim 14 wherein each structured data table entry has a date stamp, the second processing table thereby having a date stamp column, and wherein the sort order uses the date stamp column of the second processing table, and wherein the updating in the second source table uses the natural keys and the date stamp column of the second processing table and the second source table to identify the appropriate rows in the second source tables for updating.

20. The method of claim 14 wherein the first and second source tables are permanent tables, and the first and second processing tables are temporary tables.

* * * * *